US012626309B2

(12) United States Patent
Whyte et al.

(10) Patent No.: US 12,626,309 B2
(45) Date of Patent: May 12, 2026

(54) FLUID STATE-BASED FRAMEWORK

(71) Applicant: Schlumberger Technology Corporation, Sugar Land, TX (US)

(72) Inventors: John Morrison Whyte, Cambridge (GB); Maria Fernanda Vargas Izquierdo, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/892,694

(22) Filed: Sep. 23, 2024

(65) Prior Publication Data

US 2025/0111448 A1 Apr. 3, 2025

Related U.S. Application Data

(60) Provisional application No. 63/541,484, filed on Sep. 29, 2023.

(51) Int. Cl.
*G06Q 50/02* (2024.01)
*G06Q 30/018* (2023.01)

(52) U.S. Cl.
CPC ........... *G06Q 50/02* (2013.01); *G06Q 30/018* (2013.01)

(58) Field of Classification Search
CPC .............................. G06Q 50/02; G06Q 30/018
See application file for complete search history.

(56) References Cited

U.S. PATENT DOCUMENTS

| | | | |
|---|---|---|---|
| 7,128,167 B2 | 10/2006 | Dunlop et al. | |
| 10,364,662 B1 * | 7/2019 | Basu ...................... | G01V 20/00 |
| 2004/0040746 A1 * | 3/2004 | Niedermayr ............ | E21B 44/00 |
| | | | 175/48 |
| 2021/0071486 A1 * | 3/2021 | Botnan ................... | E21B 19/20 |
| 2023/0323773 A1 | 10/2023 | Whyte et al. | |

FOREIGN PATENT DOCUMENTS

WO        2024050009 A1      3/2024

OTHER PUBLICATIONS

Rehan Sadiq, Evaluation of Generic Types of Drilling Fluid Using a Risk-Based Analytic Hierarchy Process, 2003, p. 778-779 (Year: 2003).*

* cited by examiner

*Primary Examiner* — Ibrahim N El-Bathy
(74) *Attorney, Agent, or Firm* — Jeffrey D. Frantz

(57)        ABSTRACT

A method may include receiving data acquired during one or more well construction operations; detecting one or more fluid states using a number of predefined fluid states and the data, where the predefined fluid states include operational fluid states and associated fluid sub-states; generating, using the one or more fluid states, an assessment of a fluid treatment; and outputting the assessment of the fluid treatment.

4 Claims, 12 Drawing Sheets

System 100

Slant Hole 272

S-shaped Hole 274

Deep Inclined Hole 276

Horizontal Hole 278

500

| # | State | Sub State |
|---|-------|-----------|
| 1 | Drilling | Steady Volume Loss |
| | | Incorporating Solids |
| | | In/Out ECD Window |
| 2 | Circulating | Pumping Pill/Sweep |
| | | Circulating Clean |
| | | Pumps on, no drilling |
| | | Above Cement Plug |
| | | Equalise Fluid Weight |
| | | Equalise Fluid Properties |
| 3 | Treating Density Control | Barite to Active |
| | | Barite to Reserve |
| | | Heavy Fluid to Active |
| | | Heavy Fluid to Reserve |
| 4 | Treating Change Properties | Dry Product to Active |
| | | Dry Product to Reserve |
| | | Liquid Product to Active |
| | | Liquid Product to Reserve |
| 5 | Transferring | Pit to Pit |
| | | Pit to Active |
| | | Boat to Pit |
| | | Brine Tank to Pit |
| | | Hole to Pit |
| | | Pit to Boat |
| 6 | Cementing | Pumping Spacers |
| | | Pumping Cement |
| | | Returns from Cement |
| | | Displacing Cement |
| 7 | Displacing | System to System |
| | | Fluid to Brine |
| | | SW to Fluid |
| 8 | Clean-Up Dilution | Cleaning Pits/Lines |
| | | Pumping Clean-Up Train |
| | | Brine Displacement |
| 9 | Dilution | Whole Fluid |
| | | Base Fluid to Active |
| 10 | Discharging | OBM in Emergency |
| | | Planned WBM |
| | | Displace to Sea |
| | | Pulling Riser |
| 11 | Conditioning | PST Conditioning |
| | | Equalising Density/Properties |
| | | Surface PST/D Screening |
| 12 | Filtering | Tank to Pit |
| | | Pit to Pit |

| # | State | Rig Sensors | Fluid Equipment Sensors | Observations (Human in the loop) | Cementing/Other Equipment Sensors |
|---|---|---|---|---|---|
| 1 | Drilling | SPPA BPOS BVEL STIS BONB TQA | | | |
| 2 | Circulating | SPPA BPOS BVEL STIS BONB TQA | | | |
| 3 | Treating - Density Control | SPPA BPOS BVEL STIS BONB TQA | Active Pit (PVT) Reserve Pit Bulk Silo Mass Rheoprofiler (density) | Density Material Volume Pit Density | |
| 4 | Treating - Change Properties | SPPA BPOS BVEL STIS BONB TQA | PVT Rheoprofiler (rheology) Circulating System Components Mix Pump (Rig Dependent) | Products Volume/Weight Pit Density | |
| 5 | Transferring | SPPA BPOS BVEL STIS BONB TQA | PVT Mix Pump (Rig Dependent) | Pit ID Line-ups | |
| 6 | Cementing | SPPA BPOS BVEL STIS BONB TQA | PVT | Pit ID Theoretical interface strokes Line-ups | Cement Unit Pump Cement Unit Tank |
| 7 | Displacing | SPPA BPOS BVEL STIS BONB TQA | PVT Circulating System Components Rheoprofiler (density) | Pit ID Theoretical interface strokes Line-ups Electrical Stability (complementary measurement) | |
| 8 | Clean-Up | SPPA BPOS BVEL STIS BONB TQA | PVT Agitator | Pit ID Line-ups | |

Circulation to equalise density

Resumption of drilling

Barite added on surface

Method 1100

FLUID STATE-BASED FRAMEWORK

CROSS-REFERENCE TO RELATED APPLICATIONS

The subject disclosure claims priority from U.S. Application No. 63/541,484, filed on Sep. 29, 2023, herein incorporated by reference in its entirety.

BACKGROUND

A reservoir may be a subsurface formation that may be characterized at least in part by its porosity and fluid permeability. As an example, a reservoir may be part of a basin such as a sedimentary basin. A basin may be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

As an example, drilling operations may be performed to extend a borehole from a surface location to one or more target locations in a subsurface environment, for example, to produce reservoir fluid and/or to inject fluid. Drilling operations can involve use of drilling fluid, which may also be referred to as drilling mud or simply mud. Drilling fluid can serve various purposes in drilling operations, which can include lubrication and well control. Characteristics of drilling fluid can change during drilling operations, for example, through introduction of material (e.g., solids, formation fluid, etc.) and/or upon exposure to various physical phenomena (e.g., shear forces, heat, pressure, etc.). Additionally, optimal drilling fluid characteristics for one type of drilling operation may differ from those of another type of drilling operation. As a consequence, demands placed on drilling fluid can be dynamic and difficult to track during drilling operations, which can make decisions as to how to achieve desirable drilling fluid characteristics complex, which may be time consuming and costly when such decisions are to be made by a human or humans (e.g., fluids engineers, etc.).

SUMMARY

A method may include receiving data acquired during one or more well construction operations; detecting one or more fluid states using a number of predefined fluid states and the data, where the predefined fluid states include operational fluid states and associated fluid sub-states; generating, using the one or more fluid states, an assessment of a fluid treatment; and outputting the assessment of the fluid treatment. A system can include one or more processors; memory accessible to at least one of the one or more processors; processor-executable instructions stored in the memory and executable to instruct the system to: receive data acquired during one or more well construction operations; detect one or more fluid states using a number of predefined fluid states and the data, where the predefined fluid states include operational fluid states and associated fluid sub-states; generate, using the one or more fluid states, an assessment of a fluid treatment; and output the assessment of the fluid treatment. One or more computer-readable storage media can include processor-executable instructions to instruct a computing system to: receive data acquired during one or more well construction operations; detect one or more fluid states using a number of predefined fluid states and the data, where the predefined fluid states include operational fluid states and associated fluid sub-states; generate, using the one or more fluid states, an assessment of a fluid treatment; and output the assessment of the fluid treatment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The following detailed description refers to the accompanying drawings. Wherever convenient Features and advantages of the described implementations may be more readily understood by reference to the following description taken in conjunction with the accompanying drawings.

FIG. 5 shows a table of example states;
FIG. 6 shows a table of example states.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
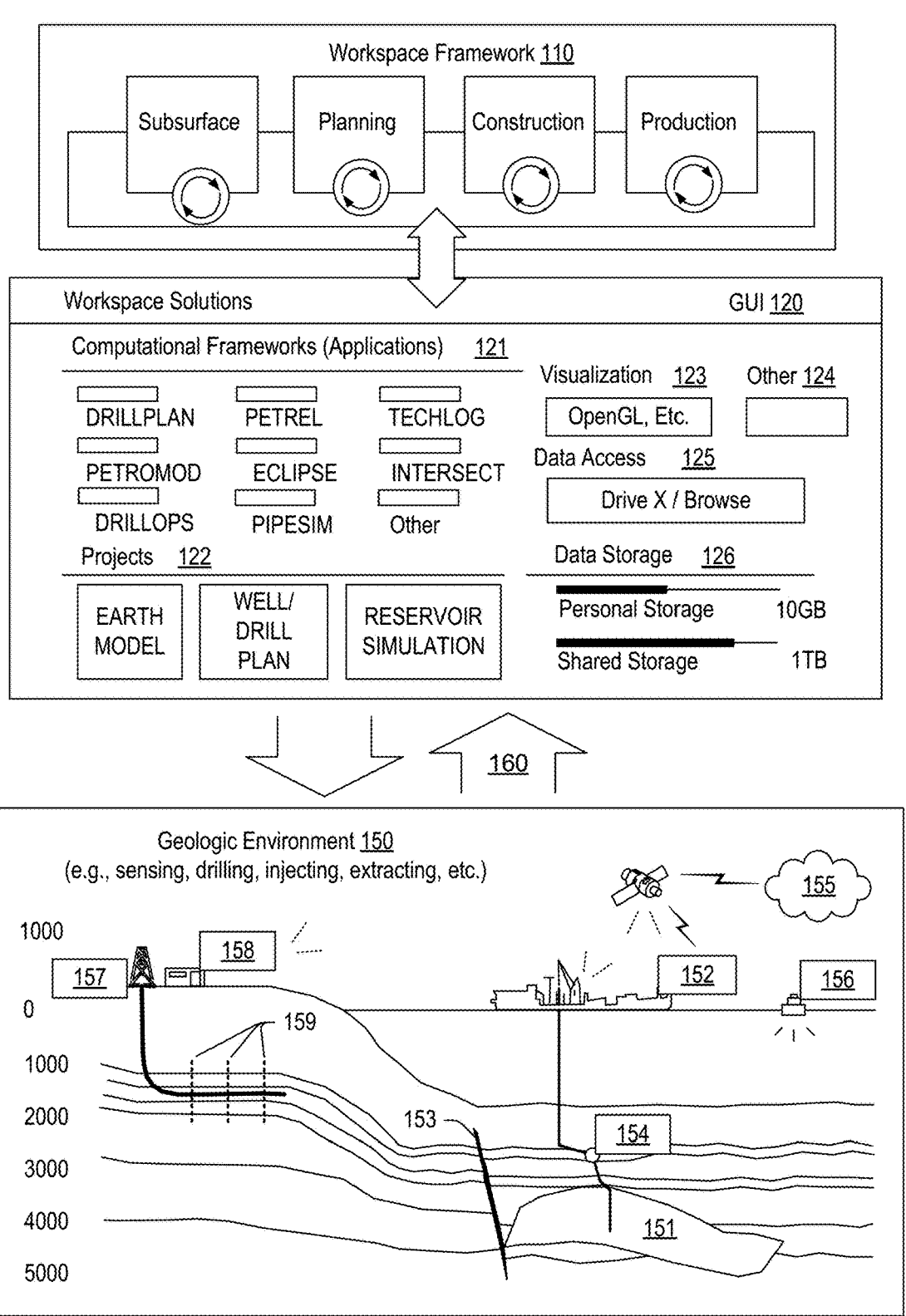
FIG. 1 shows an example of a system.

FIG. 1 shows an example of a system 100 that includes a workspace framework 110 that may provide for instantiation of, rendering of, interactions with, etc., a graphical user interface (GUI) 120. In the example of FIG. 1, the GUI 120 may include graphical controls for computational frameworks (e.g., applications, etc.) 121, projects 122, visualization features 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, DRILLOPS, PETREL, TECHLOG, PETRO-MOD, ECLIPSE, PIPESIM, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework may execute a digital drilling plan and ensures plan adherence, while delivering goal-based automation. The DRILLOPS framework may generate activity plans automatically of individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

The PETREL framework may be part of the DELFI environment for utilization in geosciences and geoengineering, for example, to analyze subsurface data from exploration to production of fluid from a reservoir. The DELFI cognitive exploration and production (E&P) environment (SLB, Houston, Texas), referred to herein as the DELFI environment or DELFI framework, is a secure, cognitive, cloud-based collaborative environment that integrates data and workflows with digital technologies, such as artificial intelligence and machine learning.

The PETREL framework provides components that allow for optimization of various exploration, development and production operations. The PETREL framework includes seismic to simulation software components that may output information for use in increasing reservoir performance, for example, by improving asset team productivity. Through use of such a framework, various professionals (e.g., geophysicists, geologists, and reservoir engineers) may develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

The TECHLOG framework may handle and process field and laboratory data for a variety of geologic environments (e.g., deepwater exploration, shale, etc.). The TECHLOG framework may structure wellbore data for analyses, planning, etc.

The PETROMOD framework provides petroleum systems modeling capabilities that may combine one or more of seismic, well, and geological information to model the evolution of a sedimentary basin. The PETROMOD framework may predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework may produce reliable results, which may be continuously updated by real-time data exchanges (e.g., from one or more types of data acquisition equipment in the field that may acquire data during one or more types of field operations, etc.). The INTERSECT framework may provide completion configurations for complex wells where such configurations may be built in the field, may provide detailed enhanced-oil-recovery (EOR) formulations where such formulations may be implemented in the field, may analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI environment on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 may be utilized for directing, controlling, etc., one or more processes in the geologic environment 150 and, feedback 160, may be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G frameworks (e.g., consider the PETREL framework, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process may implement one or more of various features that may be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. Such an approach may provide for compatibility of devices, frameworks, etc., with respect to one or more sets of instructions.

As an example, visualization features may provide for visualization of various earth models, properties, etc., in one or more dimensions. As an example, visualization features may provide for rendering of information in multiple dimensions, which may optionally include multiple resolution rendering. In such an example, information being rendered may be associated with one or more frameworks and/or one or more data stores. As an example, visualization features may include one or more control features for control of equipment, which may include, for example, field equipment that may perform one or more field operations. As an example, a workflow may utilize one or more frameworks to generate information that may be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results may be utilized to plan, simulate, perform, etc., one or more operations for production of fluid from a reservoir (e.g., reservoir rock, etc.).

Field acquisition equipment may be utilized to acquire seismic data, which may be in the form of traces where a trace may include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, may simulate fluid flow in a geologic environment based at least in part on a model that may be generated via a framework that receives seismic data. A simulator may be a computerized system (e.g., a computing system) that may execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that may be based on interpretation of seismic and/or other data. A spatial model may be a cell-based model where cells are defined by a grid (e.g., a mesh). A cell in a cell-based model may represent a physical area or volume in a geologic environment where the cell may be assigned physical properties (e.g., permeability, fluid properties, etc.) that may be germane to one or more physical phenomena (e.g., fluid volume, fluid flow, pressure, etc.). A reservoir simulation model may be a spatial model that may be cell-based.

A simulator may be utilized to simulate the exploitation of a real reservoir, for example, to examine different productions scenarios to find an optimal one before production or further production occurs. A reservoir simulator will not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that may be relatively small compared to size of a field. A balance may be struck between model scale and computational resources that results in model cell sizes being of the order of meters; rather than a lesser size (e.g., a level of detail of pores). A modeling and simulation workflow for multiphase flow in porous media (e.g., reservoir rock, etc.) may include generalizing real micro-scale data from macro scale observations (e.g., seismic data and well data) and upscaling to a manageable scale and problem size. Uncertainties may exist in input data and solution procedure such that simulation results too are to some extent uncertain. A process known as history matching may involve comparing simulation results to actual field data acquired during production of fluid from a field. Information gleaned from history matching, may provide for adjustments to a model, data, etc., which may help to increase accuracy of simulation.

As an example, a simulator may utilize various types of constructs, which may be referred to as entities. Entities may include earth entities or geological objects such as wells, surfaces, reservoirs, etc. Entities may include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class may encapsulate reusable code and associated data structures. Object classes may be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (SLB, Houston Texas) or the PIPESIM network simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, CO2 disposal, etc. The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that may optimize one or more operational scenarios at least in part via simulation of physical phenomena. The MANGROVE simulator (SLB, Houston, Texas) provides for optimization of stimulation design (e.g., stimulation treatment operations such as hydraulic fracturing) in a reservoir-centric environment. The MANGROVE framework may combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework may provide results pertaining to heterogeneous interactions between hydraulic and natural fracture networks, which may assist with optimization of the number and location of fracture treatment stages (e.g., stimulation treatment(s)), for example, to increased perforation efficiency and recovery.

As an example, data may include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology (SLB, Houston, Texas). As an example, a LITHO SCANNER tool may be or include a gamma ray spectroscopy tool.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework.

As an example, a workflow may utilize one or more types of data for one or more processes (e.g., stratigraphic modeling, basin modeling, completion designs, drilling, production, injection, etc.). As an example, one or more tools may provide data that may be used in a workflow or workflows that may implement one or more frameworks (e.g., PETREL, TECHLOG, PETROMOD, ECLIPSE, etc.).

In the example of FIG. 1, drilling may be performed in the geologic environment 150, for example, to access the reservoir 151, which may be accessed from land or offshore. In FIG. 1, the downhole equipment 154 may be, for example, part of a bottom hole assembly (BHA). The BHA may be used to drill a well. The downhole equipment 154 may communicate information to equipment at the surface, and may receive instructions and information from the equipment at the surface. During a well construction process, a variety of operations (such as cementing, wireline evaluation, testing, etc.) may be conducted. In such embodiments, data collected by tools and sensors and used for reasons such as reservoir characterization may be collected and transmitted.

A well may include a substantially horizontal portion (e.g., lateral portion) that may intersect with one or more fractures. For example, a well in a shale formation may pass through natural fractures, artificial fractures (e.g., hydraulic fractures), or a combination thereof. Such a well may be constructed using directional drilling techniques as described herein. However, these same techniques may be used in connection with other types of directional wells (such as slant wells, S-shaped wells, deep inclined wells, and others) and are not limited to horizontal wells.

Figure 2:
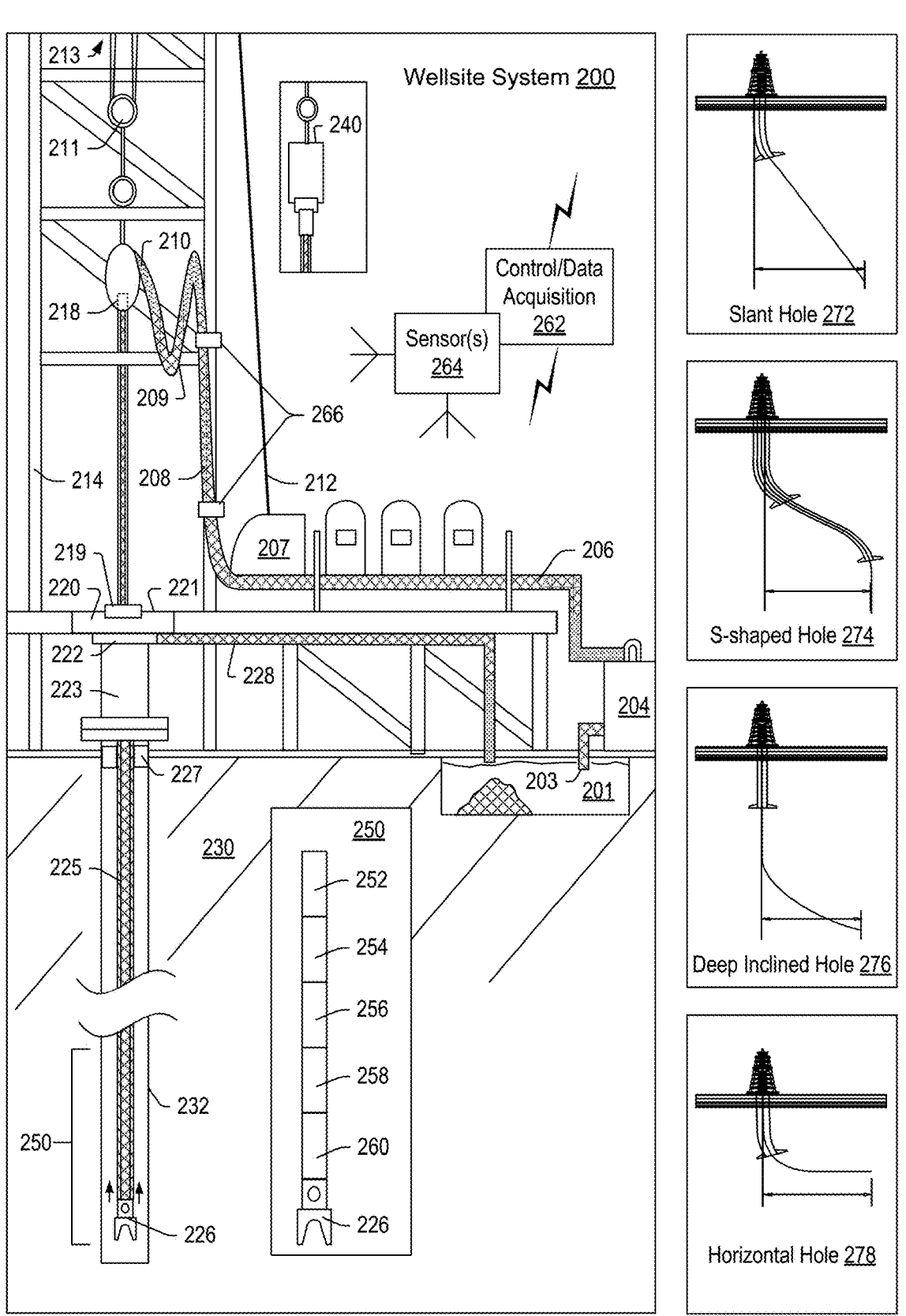
FIG. 2 shows an example of a system.

FIG. 2 shows an example of a wellsite system 200 (e.g., at a wellsite that may be onshore or offshore). As shown, the wellsite system 200 may include a mud tank 201 for holding mud and other material (e.g., where mud may be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212, a derrick 214, a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 may provide for operation of the drillstring 225 and other operations. As shown, the wellsite system 200 includes the traveling block 211 and the derrick 214 positioned over the borehole 232. As mentioned, the wellsite system 200 may include the rotary table 220 where the drillstring 225 pass through an opening in the rotary table 220.

As shown in the example of FIG. 2, the wellsite system 200 may include the kelly 218 and associated components, etc., or a top drive 240 and associated components. As to a kelly example, the kelly 218 may be a square or hexagonal metal/alloy bar with a hole drilled therein that serves as a mud flow path. The kelly 218 may be used to transmit rotary motion from the rotary table 220 via the kelly drive bushing 219 to the drillstring 225, while allowing the drillstring 225 to be lowered or raised during rotation. The kelly 218 may pass through the kelly drive bushing 219, which may be driven by the rotary table 220. As an example, the rotary table 220 may include a master bushing that operatively couples to the kelly drive bushing 219 such that rotation of the rotary table 220 may turn the kelly drive bushing 219 and hence the kelly 218. The kelly drive bushing 219 may include an inside profile matching an outside profile (e.g., square, hexagonal, etc.) of the kelly 218; however, with slightly larger dimensions so that the kelly 218 may freely move up and down inside the kelly drive bushing 219.

As to a top drive example, the top drive 240 may provide functions performed by a kelly and a rotary table. The top drive 240 may turn the drillstring 225. As an example, the top drive 240 may include one or more motors (e.g., electric and/or hydraulic) connected with appropriate gearing to a short section of pipe called a quill, that in turn may be screwed into a saver sub or the drillstring 225 itself. The top drive 240 may be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 may hold mud, which may be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud may then flow via a passage (e.g., or passages) in the drillstring 225 and out of ports located on the drill bit 226 (see, e.g., a directional arrow). As the mud exits the drillstring 225 via ports in the drill bit 226, it may then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud may be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud may cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such an example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurementwhile-drilling (MWD) module 256, an optional module 258, a rotary-steerable system (RSS) and/or motor 260, and the drill bit 226. Such components or modules may be referred to as tools where a drillstring may include a plurality of tools.

As to an RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling may commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor may present some challenges depending on factors such as rate of penetration (ROP), transferring weight to a bit (e.g., weight on bit, WOB) due to friction, etc. A mud motor may be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a mud motor (e.g., PDM) may be operated in different modes, which may include a rotating mode and a sliding mode. A sliding mode involves drilling with a mud motor rotating the bit downhole without rotating the drillstring from the surface. Such an operation may be conducted when a BHA has been fitted with a bent sub or a bent housing mud motor, or both, for directional drilling. Sliding may be used in building and controlling or adjusting hole angle. In directional drilling, pointing of a bit may be accomplished through a bent sub, which may have a relatively small angle offset from the axis of a drillstring, and a measurement device to determine the direction of offset. Without turning the drillstring, the bit may be rotated with mud flow through the mud motor to drill in the direction it is pointed. With steerable motors, when a desired wellbore direction is attained, the entire drillstring may be rotated to drill straight rather than at an angle. By controlling the amount of hole drilled in the sliding mode versus the rotating mode, a wellbore trajectory may be controlled rather precisely.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM may be determined or estimated as a sum of the SRPM and the mud motor RPM, assuming the SRPM and the mud motor RPM are in the same direction.

As an example, a PDM mud motor may operate in a so-called sliding mode, when the drillstring is not rotated from the surface. In such an example, a bit RPM may be determined or estimated based on the RPM of the mud motor.

An RSS may drill directionally where there is continuous rotation from surface equipment, which may alleviate the sliding of a steerable motor (e.g., a PDM). An RSS may be deployed when drilling directionally (e.g., deviated, horizontal, or extended-reach wells). An RSS may aim to minimize interaction with a borehole wall, which may help to preserve borehole quality. An RSS may aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and may contain one or a plurality of selected types of logging tools. It will also be understood that more than one LWD and/or MWD module may be employed. Where the position of an LWD module is mentioned, as an example, it may refer to a module at the position of the LWD module 254, the MWD module 256, etc. An LWD module may include capabilities for measuring, processing, and storing information, as well as for communicating with the surface equipment. In the illustrated example, the LWD module 254 may include a seismic measuring device.

The MWD module 256 may be housed in a suitable type of drill collar and may contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller may generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation may include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well may include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring may include a positive displacement motor (PDM).

As an example, a system may be a steerable system and include equipment to perform methods such as geosteering. As mentioned, a steerable system may be or include an RSS. As an example, a steerable system may include a PDM or of a turbine on a lower part of a drillstring which, just above a drill bit, a bent sub may be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment may make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, may allow for implementing a geosteering method. Such a method may include navigating a subsurface environment, for example, to follow a desired route to reach a desired target or targets.

As an example, a drillstring may include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering may include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 may include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 may be provided for tracking pipe, tracking movement of at least a portion of a drillstring, etc.

As an example, the system 200 may include one or more sensors 266 that may sense and/or transmit signals to a fluid conduit such as a drilling fluid conduit (e.g., a drilling mud conduit). For example, in the system 200, the one or more sensors 266 may be operatively coupled to portions of the standpipe 208 through which mud flows. As an example, a downhole tool may generate pulses that may travel through the mud and be sensed by one or more of the one or more sensors 266. In such an example, the downhole tool may include associated circuitry such as, for example, encoding circuitry that may encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 may include a transmitter that may generate signals that may be transmitted downhole via mud (e.g., drilling fluid) as a transmission medium.

As an example, one or more portions of a drillstring may become stuck. The term stuck may refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this may refer to a portion of a drillstring that cannot be rotated or moved axially. As an example, a condition referred to as "differential sticking" may be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking may have time and financial cost.

As an example, a sticking force may be a product of the differential pressure between the wellbore and the reservoir and the area that the differential pressure is acting upon. This means that a relatively low differential pressure (delta p) applied over a large working area may be just as effective in sticking pipe as may a high differential pressure applied over a small area.

As an example, a condition referred to as "mechanical sticking" may be a condition where limiting or prevention of motion of the drillstring by a mechanism other than differential pressure sticking occurs. Mechanical sticking may be caused, for example, by one or more of junk in the hole, wellbore geometry anomalies, cement, keyseats or a buildup of cuttings in the annulus.

Figure 3:
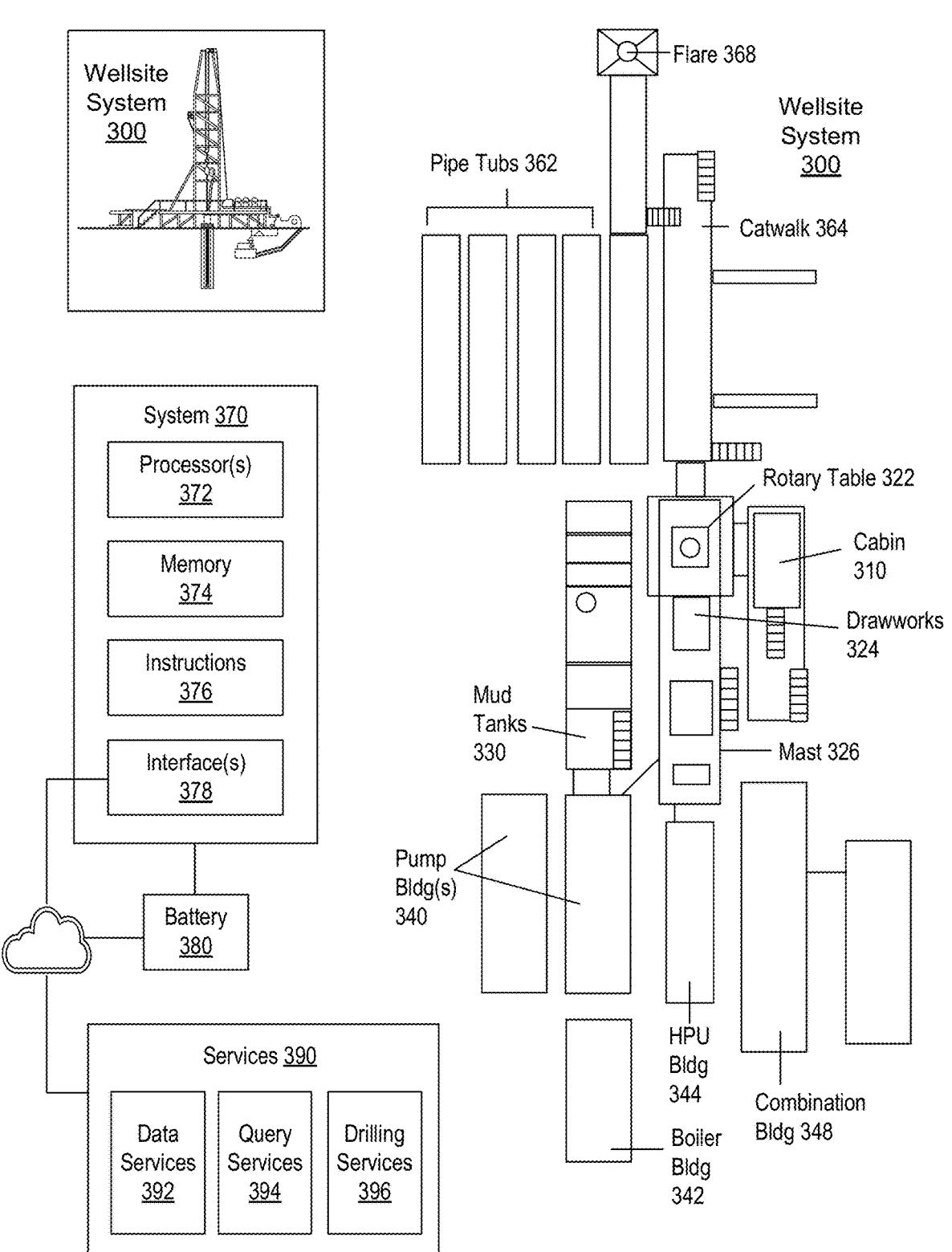
FIG. 3 shows an example of a system.

FIG. 3 shows an example of a wellsite system 300, specifically, FIG. 3 shows the wellsite system 300 in an approximate side view and an approximate plan view along with a block diagram of a system 370.

In the example of FIG. 3, the wellsite system 300 may include a cabin 310, a rotary table 322, drawworks 324, a mast 326 (e.g., optionally carrying a top drive, etc.), mud tanks 330 (e.g., with one or more pumps, one or more shakers, etc.), one or more pump buildings 340, a boiler building 342, an HPU building 344 (e.g., with a rig fuel tank, etc.), a combination building 348 (e.g., with one or more generators, etc.), pipe tubs 362, a catwalk 364, a flare 368, etc. Such equipment may include one or more associated functions and/or one or more associated operational risks, which may be risks as to time, resources, and/or humans.

As shown in the example of FIG. 3, the wellsite system 300 may include a system 370 that includes one or more processors 372, memory 374 operatively coupled to at least one of the one or more processors 372, instructions 376 that may be, for example, stored in the memory 374, and one or more interfaces 378. As an example, the system 370 may include one or more processor-readable media that include processor-executable instructions executable by at least one of the one or more processors 372 to cause the system 370 to control one or more aspects of the wellsite system 300. In such an example, the memory 374 may be or include the one or more processor-readable media where the processor-executable instructions may be or include instructions. As an example, a processor-readable medium may be a computer-readable storage medium that is not a signal and that is not a carrier wave.

FIG. 3 also shows a battery 380 that may be operatively coupled to the system 370, for example, to power the system 370. As an example, the battery 380 may be a back-up battery that operates when another power supply is unavailable for powering the system 370. As an example, the battery 380 may be operatively coupled to a network, which may be a cloud network. As an example, the battery 380 may include smart battery circuitry and may be operatively coupled to one or more pieces of equipment via a SMBus or other type of bus.

In the example of FIG. 3, services 390 are shown as being available, for example, via a cloud platform. Such services may include data services 392, query services 394 and drilling services 396. As an example, the services 390 may be part of a system such as the system 100 of FIG. 1 (e.g., consider planning services and/or operational services). As an example, the services 390 may include one or more services for directional drilling (e.g., consider a computational framework that may provide for one or more services that utilize real-time data to estimate one or more parameters, etc.).

As an example, the system 370 may be utilized to generate one or more rate of penetration drilling parameter values, which may, for example, be utilized to control one or more drilling operations.

Figure 4:
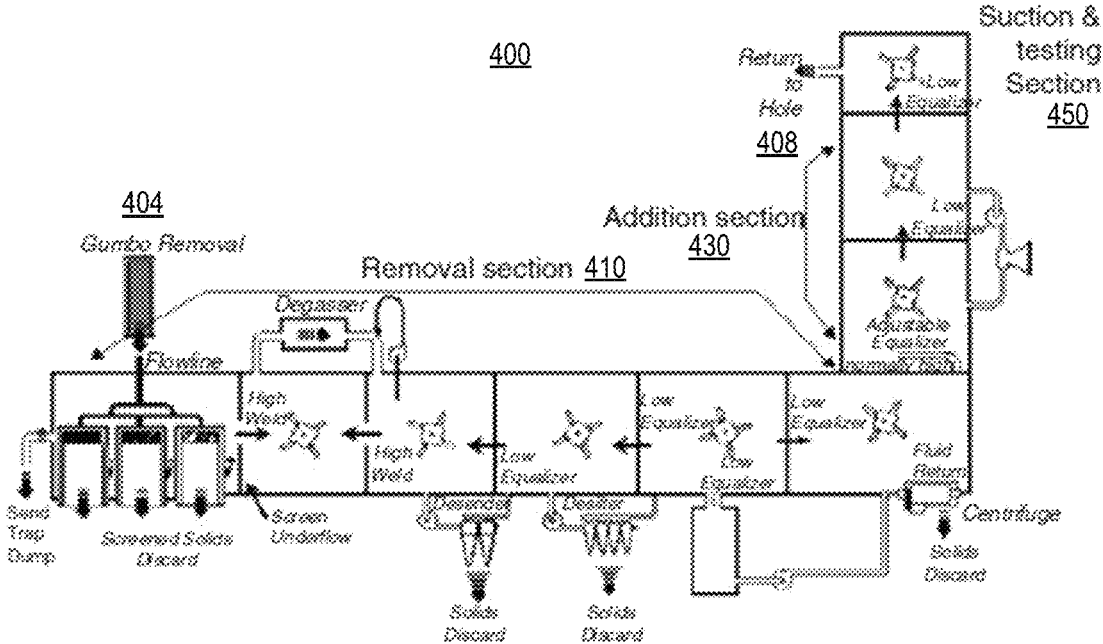
FIG. 4 shows an example of a system.

FIG. 4 shows an example of a drilling fluid (e.g., mud) system 400 that includes an inlet 404 for receiving drilling fluid from a borehole and an output 408 for flowing drilling fluid for return to a borehole. As shown, the system 400 can include a removal section 410, an addition section 430 and a suction and testing section 450. As an example, the system 400 can include a gumbo removal unit, screening units, a degassing unit, weld units, equalizer units, a centrifuge unit, etc. As shown, various units can include tanks for holding drilling fluid where one or more tanks may include one or more mixers. As an example, the addition section 430 may include one or more ports, etc., for introduction of one or more additives. As an example, a system may include a fewer number of tanks or a greater number of tanks than the system 400. As an example, tanks may include a trip tank that may be utilized during tripping operations (e.g., running into hole (RIH), pulling out of hole (POOH), etc.).

As to the term "gumbo", it may refer to a nonspecific type of shale that becomes sticky when wet and adheres aggressively to surfaces. For example, gumbo may form mud rings and balls that can plug an annulus, a flowline and shale-shaker screens. Gumbo is likely to contain appreciable amounts of Ca+2 smectite clays and may be dispersed in a water mud, causing rapid accumulations of colloidal solids.

As an example, drilling fluid may be an oil-based mud (OBM), which can include synthetic oil-based mud (SOBM), or a water-based mud (WBM). As to OBM, it may be an invert-emulsion mud, or an emulsion whose continuous phase is oil. Various types of commercial oil muds may be formulated with 5 vol. % water or more or less than 5 vol. % water. Various types of nonwater-base drilling fluids can include synthetic fluid (e.g., ethers, esters, olefin oligomers, blends, etc.), diesel oil, and/or mineral oil (e.g., ordinary and enhanced purity). As to water-base muds (WBMs), they can be defined as drilling fluid (mud) in which water or saltwater is the major liquid phase as well as the wetting (external) phase. General categories of water-base muds include fresh water, seawater, salt water, lime, potassium and silicate. As an example, a water-base mud can be a clear water, clay base, silicate, clay and polymer, polymer with low or no clay, clear brine, etc.

Various types of muds (e.g., drilling fluids, lubricants, etc.) may take time and resources to formulate. For example, consider a recipe for making mud that commences with one or more base materials, one or more ingredients, one or more premixes, etc., where the order of ingredients, mixing times, temperatures, etc., may be controlled. A formulated mud may be of considerable value and suitable for reuse. For example, after an operation is performed, at least a portion of the mud may be collected (e.g., in a tank, etc.) and transported to another site for use.

As an example, where mud becomes contaminated beyond an acceptable level, processing and/or disposal may be options, which can add cost, time, resources, etc. As to disposal, various regulations can exist that control how and/or where mud is disposed. In general, mud with less contamination may be easier and less expensive to handle than mud with more contamination.

As an example, a framework may provide for determination of fluid states, which may be operational states that occur during one or more well construction operations (e.g., drilling operations, fracturing operations, injection operations, etc.). For example, consider drilling fluid states that occur during one or more drilling operations. Such states may be utilized for one or more purposes, which may be for planning, monitoring, controlling equipment, making adjustments to drilling fluid, disposal of drilling fluid, etc.

As an example, a fluid state may pertain to what is happening to a fluid and/or why a particular operation is being performed. As an example, a workflow may include defining fluid states as a basis for automation of drilling fluid operations and/or related operations. As an example, a framework may operate based on fluid states where, for example, the framework may provide for structured recording of fluids-related operational data that may aid in enhanced understanding during post-job analysis for improved offset well analysis. As an example, such data may be utilized for purposes of training a model, which may be a machine learning model (ML model). For example, consider a model that may receive data as input and determine what fluid state exists and what transitions may occur and/or what transitions may be expected to occur. In such an example, a framework may operate with or without use of rig states. Rig states may be utilized to define various states drilling equipment or other rig-deployed or associated equipment may be in during one or more field operations. For example, drilling may be a rig state, adding a length of drillpipe may be a rig state, engaging slips (e.g., in-slips) or disengaging slips (e.g., out-of-slips) may be rig states, etc. While such rig states may be associated with fluid operations, fluid states can more particularly characterize fluid during such fluid operations.

As mentioned, a workflow can include defining a number of fluid states, which may aim to capture domain knowledge for one or more fluid automation paths. Fluid states may be defined to facilitate understanding of fluid behaviors, such as, for example, characteristics that may change with respect to time due to one or more factors. As an example, a framework can utilize a number of data channels that can provide various types of data where the framework may utilize one or more of the number of data channels for state determinations where, for example, each state determination may utilize the same or different data channels.

As an example, a framework may provide for detecting one or more fluid states and/or one or more fluid state transitions (e.g., transition periods, etc.). As an example, a framework may operate to detect instances of lost circulation events, whether evidenced by live and/or historical data. For example, a framework may detect one or more lost circulation events live and/or retrospectively where the framework can provide for recordation of channel data and/or data derived from channel data that facilitates analysis. As an example, a framework may provide for recordation of data as to fluid treatments, fluid displacements, fluid clean-ups, fluid transfers, etc. As explained, a framework may provide defined fluid states that can be determined and/or be categorized by structured data in a manner that enhances understanding of fluid operations. Such an approach can increase markedly and enable greater data fusion between fluids and various well construction services.

In various examples, fluid states may be utilized in addition to rig states and/or one or more other types of activity codes. As explained, fluid states can be utilized in a manner that can help to detect one or more processes that may cause and/or have caused fluid to change (e.g., and thus an entire operation in time to change).

FIG. 5 shows a table 500 of various examples of fluid states, which may be tiered as including states and sub-states (e.g., optionally sub-sub-states, etc.). In the table 500, 12 fluid states are presented along with 44 sub-states. For example, consider a fluid state for drilling with sub-states of steady volume loss, incorporating solids, and in or out of an effective density (ECD) window.

As to effective density (ECD), it may be defined as the effective density exerted by a circulating fluid against a formation that considers a pressure drop in an annulus above a point being considered. For example, ECD may be computed as: d+P/(0.052*D), where d is the mud weight (ppg), P is the pressure drop in the annulus between depth D and surface (psi), and D is the true vertical depth (feet). ECD may be a parameter utilized to assess scenarios involving kicks and losses (e.g., particularly in wells that have a narrow window between a fracture gradient and pore-pressure gradient).

As to a fluid state for circulating, it may include sub-states such as, for example, one or more of pumping pill and/or sweep, circulating clean, pumps on and no drilling, above cement plug, equalize fluid weight and equalize fluid properties.

In the table 500, examples are also shown for fluid states of treating density control, treating change properties, transferring, cementing, displacing, clean-up dilution, dilution, discharging, conditioning, and filtering; noting that one or more other additional and/or alternative fluid states may be included in definitions. As an example, definitions may be extensible at one or more levels (e.g., states, sub-states, sub-sub-states, etc.).

As indicated, a state may relate to an additive such as, for example, barite. In a fluid context, barite can refer to a dense mineral that includes barium sulfate ($BaSO_4$), which may be utilized as a weighting agent for one or more types of drilling fluids. As an example, barites may be mined and shipped as ore to grinding plants in particular locations, where, for example, the American Petroleum Institute (API) standards specify grinding to a particle size of 3 microns to 74 microns. Pure barium sulfate has a specific gravity of 4.50 g/cm3, but drilling-grade barite is expected to have a specific gravity of at least 4.20 g/cm3 to meet API specifications. Contaminants in barite may include, for example, one or more of cement, siderite, pyrrhotite, gypsum, and anhydrite, which may cause problems in certain mud systems and may be evaluated as to quality assurance for drilling mud additives. As explained, a state and/or a sub-state may pertain to an additive such as, for example, barite.

In various examples, an additive may be added to an active fluid and/or to a reserve fluid (e.g., active tank(s) and/or reserve tank(s)). For example, consider an additive that may be a heavy fluid, a dry product, a liquid product, a brine, etc. As explained, one or more states, which may include one or more sub-states, etc., may be defined on a basis of a type of material, which may be an additive.

As an example, a fluid state may relate to a tester or testing. For example, consider a production screen tester or test (PST). A PST may be designed to test flow-back of completion fluids at a rig site, which may help to expedite data acquisition; noting that fluid samples may also be transferred to a lab. As an example, a PST may test field fluids in real time with samples of an actual production screen being used downhole. As an example, results from a PST may provide for determining if fluid remaining in an annulus will flow back through a production screen.

As an example, a fluid state may relate to a supply of fluid, which may be from a vehicle such as, for example, a train car, a tank truck, a boat or ship, etc.

As an example, a fluid state may relate to one or more types of pumping techniques for one or more types of pumpable materials. For example, consider pumping of a spacer, pumping of cements, etc. As to a spacer, it may be a viscous fluid used to aid removal of drilling fluid before a primary cementing operation. For example, a spacer may be prepared with specific fluid characteristics, such as viscosity and density, that are engineered to displace drilling fluid while enabling placement of a complete cement sheath.

As explained, one or more states may relate to cleaning or clean-up operations. For example, consider cleaning of tanks, lines, etc. In various instances, such operations may utilize one or more fluids for purposes of cleaning.

As an example, one or more states may relate to offshore and/or onshore equipment and/or operations. As an example, a fluid state may relate to a riser, which may be a conduit that can provide a temporary extension of a subsea oil well to a surface drilling facility. For example, consider a marine drilling riser used with a subsea blowout preventer (BOP) and generally used by floating drilling vessels and a tie-back drilling riser used with a surface BOP and generally deployed from fixed platforms or stable floating platforms (e.g., a spar or tension leg platform).

As to a fluid state of drilling, it may relate to a method of making hole that relies on continuous circular motion of a bit to break rock at the bottom of the hole. Rotary drilling may be a nearly continuous process because cuttings are removed as drilling fluids circulate through the bit and up the wellbore to the surface; noting that drilling may be performed using a sliding mode where, for example, a mud motor is powered by flow of drilling fluid to rotate a bit where, for example, a drillstring may be oscillated in clockwise and counter-clockwise directions at surface while the mud motor drives the bit.

While drilling, as a fluid state, may encompass drilling/Maxwell states where drilling results in a steady increase in hole volume. Solids may be steadily introduced to the fluid as drilling proceeds, not all of which can be removed effectively noting that drilling increases natural seepage losses to the formation via filtration/filter cake formation. Therefore, even in normal conditions, fluid is being changed by drilling. More tenuously, drilling increases the ECD beyond standard circulation and this effect might be noted by a fluid state.

As to circulating, as a fluid state, it can involve pumping fluid through an active fluid system, including the borehole and surface tanks that constitute the primary system, most commonly during drilling. Fluid may be circulated around a well for various reasons, which may differ yet appear to be the same from a post-job analysis or remote operations point-of-view. Circulation during drilling may be identified but at various times during the drilling of a well, fluid might be circulated to transport sweeps/pills around the well, to circulate clean during/after a stand, above a cement plug (to remove spacer) to adjust fluid properties or might simply be left on to avoid static conditions. To a remote operator, distinguishing between these states from data alone may be quite difficult; noting that different circulation reasons can have different consequences so a fluid state identifying circulation as being of a particular type can be beneficial.

As to treating (e.g., density control and property changes), such a fluid state can pertain to a process of deliberately altering one or more properties of a circulating system, or reserve fluid, primarily via the addition of liquid or solids chemical additives. From the point-of-view of a drilling fluids specialist, attention to treatment operations and effects is a main focus. In general, a substantial amount of effort (e.g., time and resources) goes into planning treatments and implementing them, including supplementary testing. For remote monitoring and/or control of operations, a framework can provide knowledge as to changes in fluid system properties, whether due to one or more treatments and/or other phenomena (e.g., influx, etc.). Various treatments may increase fluid volume, as such, a framework may provide for distinguishing a reason or reasons for an increase in fluid volume. In various instances, one or more effects of a fluid treatment may be other than expected, noting that some types of effects may be relatively unpredictable by a human. For example, a viscosifier might yield more than expected or dilution might cut weight unexpectedly. As an example, a framework can provide for assessments of post-treatment behaviors.

As to transferring, as a fluid state, it can pertain to moving fluid from one area of a system to another. For example, consider transferring fluid to an active tank from a reserve tank and/or vice versa. As another example, consider a transfer to a reserve volume from one or more unmonitored sources (e.g., consider a boat or brine tank that is currently not being monitored with fluid being added to the circulating system). As an example, back-loads may also be covered by a transferring state.

As an example, when fluid is transferred between pits (e.g., tanks), a decrease in one may usually be met with a corresponding increase in another. When an active system is involved, it can be more difficult to understand what a transfer is, what a top-up is to mitigate losses or what is part of a treatment/dilution. As an example, a framework may utilize fluid transfer as a state to enable a greater understanding of surface volume, which may inform decision-making and/or knowledge of what decisions may have been made.

As to cementing, as a fluid state, it can involve preparing and pumping cement into place in a wellbore. Cementing operations may be undertaken to seal an annulus after a casing string has been run, to seal a lost circulation zone, to set a plug in an existing well from which to push off with directional tools or to plug a well so that it may be abandoned, etc.

During cementing operations, returns will often be taken to the surface system without fluid volume replacing it, for example, where a cement unit controls the operation. With specific reference to remote operations, cementing operations can be hard to interpret and the volume gain could be misconstrued as an influx/kick. Pumping of spacers can also be difficult to interpret, especially as some of their volumes are inevitably incorporated into bulk fluid thus creating a cementing fluid state would make data far more comprehensible. As an example, a framework can provide for detection of one or more cementing states that can impact one or more characteristics of drilling fluid (e.g., properties, volume, etc.).

As to displacing, as a fluid state, it can involve using one fluid, usually drilling fluid, to force a cement slurry out of the casing string and into the annulus or to change from one fluid system to another (e.g., WBM to OBM).

Without a fluid state for displacements, the process of changing the fluid system from a WBM to OBM, which tends to be a radical change, may appear simply as a transfer between pits on a screen. In such an example, a remote operator may have no way to know that the fluid system is totally different to how it was before. As an example, a framework can provide for detection of displacements. As an example, a framework may provide for detection and/or tracking of one or more interfaces, which may affect an active system's properties greatly and result in new volume to be stored in reserve pits. As an example, a framework can reduce uncertainty regarding interfaces, which may be reduced with a suitable fluid state.

As an example, a clean-up fluid state can be distinguished from a production definition. As to a clean-up state, it can pertain to a process of cleaning surface systems to be water-wet, prior to a displacement of the well to completion brine. In various instances, clean-ups can be a concerning time for drilling fluid engineers, more so than drilling. As explained, drilling fluid is to be removed from the surface system and replaced by brine and components of a clean-up pill train. As an example, a framework can provide for distinguishing between a clean-up displacement and a standard displacement/circulation, which may facilitate remote supervision and/or proper fluid management at a rig site.

As to dilution, as a fluid state, it can pertain to a process which involves adding base fluid or fresh drilling fluid to a circulating system. Such a process can provide for removal of colloidal size particles. Dilutions tend to be relatively large-scale treatments that can involve considerable volume-builds or discharge of much of the existing circulating system. In either instance, an active system may be altered. As explained, there can be a relatively rapid change in fluid properties distinct from targeted treatments and thus can be considered a separate state for fluid.

As to discharging, as a fluid state, it can involve removing fluid from a rig's surface volume to a non-storage area (e.g., sending sea water or WBM directly overboard, to the sea instead of to a tank). Discharging is, in most cases, a planned removal of volume from a rig. A framework can utilize a state as to discharging that allows for distinguishing from lost circulation and/or one or more other forms of transfer off-site (e.g., to a boat, etc.).

As to conditioning, as a fluid state, it can involve circulating an active system, combined with non-chemical interventions, to create a homogeneous fluid with specific properties. An example of this that distinguishes it from treatment and simple circulation would be conditioning fluid to Production Screen Test (PST) specifications. As an example, without an appropriate fluid state assignation, conditioning may be difficult to distinguish from standard circulation. Conditioning can introduce a considerable amount of flat time (NPT) during drilling and can be a rate-limiting step for one or more operations. As an example, a framework can provide for identification of conditioning in a manner that can enable accurate analysis and comparison of operations. For example, PST conditioning can take over 24 hours so knowing that this is happening would aid in monitoring, control, etc., whether local and/or remote.

As to filtration, as a fluid state, it can involve a process of treating a completion or workover fluid to remove debris and fine particles that may cause near-wellbore damage if allowed to enter a reservoir formation. Such filtration may be used with brines although more complex fluids occasionally undergo filtration. As an example, when brine filtration is required, it may be a rate-limiting step for an operation. To be able to properly coordinate this operation, particularly remotely, a framework can utilize a filtration fluid state to distinguish such an operation from one or more standard fluid transfers. In various instances, some filtration steps may be between storage units that are not part of a circulation system; hence, a framework with suitable fluid states can facilitate various remote operators to identify filtration in these circumstances.

FIG. 6 shows a table 600 of some examples of states and data, which can include one or more types of data, which can include sensor data, human observed data, etc. As shown in the table 600, various sensors may include rig sensors such as, for example, one or more rig sensors for standpipe pressure (SPPA), block position (BPOS), block velocity (BVEL), slips (STIS) (e.g., in-slips, out-of-slips), bit on bottom (BONB), and torque (TQA). As shown, fluid system data may include fluid system sensor data for fluid and/or equipment such as, for example, pressure, volume, temperature, density, rheology, pumps, valves, injectors, mixers, etc. As shown, one or more other types of equipment sensors may provide data (e.g., cementing equipment, etc.). For example, consider fluid associated with one or more cementing operations where a cement unit can include one or more pumps, lines, tanks, etc. In various instances, cementing operations can include drilling fluid, for example, cement may displace drilling fluid.

As an example, a framework can provide automated treatment advice for drilling fluid systems. For example, consider a framework that can include various components for making determinations as to fluid treatment, which may be part of a more expansive fluids advisor system. As an example, a framework may include components built using data sets and physical and chemical knowledge that can provide treatment recommendations based on signatures in digital fluids data. For example, consider a framework that can receive data determine a signature and, based on the signature, generate a recommendation, which may be implemented in the field, for example, as one or more control actions.

As an example, a framework may utilize one or more states, which may be operational states as to one or more types of equipment, fluids, etc. For example, consider a framework that can utilize rig states and/or fluid states.

As an example, a framework can provide qualitative and quantitative advice on fluid treatments to drilling fluids specialists at rig site and/or operating remotely and/or control instructions to equipment at a rig site. Such advice may be based on analysis of customized annotated data sets for use in signature detection in situations where a treatment may be desirable. In such an approach, one or more automated fluid monitoring systems may inform recommendations and facilitate fluids domain knowledge.

As an example, a framework may operate as a tool that can generate advice, which may be in the form of instructions for one or more levels of control (e.g., automated levels, semi-automated levels, manual levels, etc.). Such advice may be based on one or more determinations as to benefits of treating fluid of a fluid system while drilling, which may help to improve drilling. As an example, advice may be to recommend what action or actions may be taken to rectify contamination in fluid.

As an example, a framework can provide for selecting an appropriate treatment to modify a drilling fluid, for example, from a non-ideal state to a desired state with desired properties. In such an example, the framework may provide output to relatively complex scenarios where the framework is aided by knowledge of data signals that can indicate that one or more issues exist (e.g., contamination, etc.). As an example, a framework may generate a treatment decision on the basis of knowledge of chemistry and behavior of a fluid system and of one or more factors such as, for example, potential additives, formation being drilled, products available at a rig site, drilling parameters (e.g., flow rate, active system volume, bit depth, effective density, etc.), solids control system, mixing capabilities at a rig site, etc.

While general guidelines may exist for fluid treatment, such static information does not provide for a data-driven approach for automatically identifying when a fluid may benefit from treatment nor for a data-driven approach for automatically generating instructions as to how to make and implement a treatment that may be beneficial. In various scenarios, choice of product may be relevant along with factors such as one or more of addition rate, concentration, mixing regime, etc. For example, a fluids specialist might know that a particular additive may be added to increase viscosity but not know how quickly to add that additive nor not know what desired target properties are to be achieved (e.g., in a time-dependent manner). In such an example, the fluids specialist may miss a window of opportunity during drilling operations that may introduce some amount of non-productive time (NPT) and/or that may actually alter fluid properties too late in a manner that may be detrimental or suboptimal for a subsequent field operation (e.g., POOH, etc.).

As an example, a framework may be part of a system and/or operatively coupled to a system to provide automated treatment advice on a relatively extensive range of fluid properties where the framework may learn from treatment decisions to inform future decisions, creating a self-learning fluid treatment framework.

As explained, a framework can generate fluid treatment advice, particularly as to properties of a drilling fluid. In such an example, various measurements of particular fluid properties may be checked for corresponding positions within corresponding specifications and/or target windows. For example, depending on a measurement's position and its relation to a user-defined previous set of data points, a framework may either give no advice as everything is normal, or flag a situation to a user that the framework believes a decision on treatment would be beneficial (e.g., taking no action would be a valid decision). As to being beneficial, such a decision may be beneficial for a current operation and/or a future operation (e.g., drilling, POOH, RIH, etc.) and/or to help maintain wellbore stability (e.g., diminish risk of kick, washout, etc.).

Figure 7:
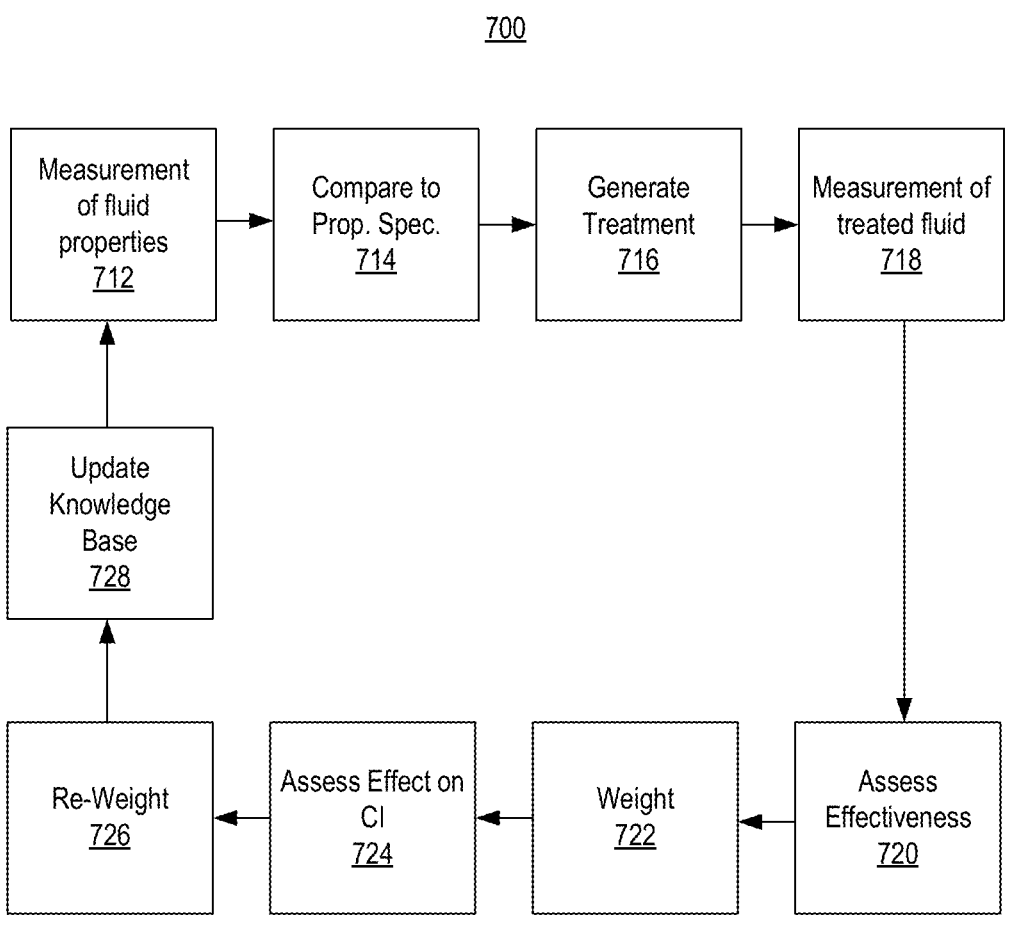
FIG. 7 shows an example of a method.

FIG. 7 shows an example of a method 700 that includes a measurement block 712 for measurement of fluid properties, a comparison block 714 for comparison of measurement of fluid properties to one or more property specifications, a generation block 716 for generation of a treatment (e.g., advice or recommendation), a measurement block 718 for measurement of treated fluid properties, an assessment block 720 for assessment of effectiveness of the treatment, a weighting block 722 for weighting one or more factors, an assessment block 724 for assessing effectiveness of the treatment, as weighted, on a condition index (CI) (e.g., for each fluid property while drilling, etc.), a re-weighting block 726 for re-weighting one or more factors, and an update block 728 for updating a knowledge base.

As to a condition index (CI), it may be defined for monitoring evolution of drilling fluids during drilling operations (e.g., drilling to extend a borehole, running in hole (RIH), pulling out of hole (POOH), etc.). As an example, a framework may operate as a comprehensive fluids advisor system using a CI. For example, custom data sets and fluid chemistry knowledge may be utilized to build a CI to assess performance of drilling fluid in real-time. In such an approach, a suitable treatment can be prescribed, and the state and performance of fluid post-treatment can be monitored.

As explained, a framework can operate to provide a holistic assessment of a drilling fluid's condition to aid drilling fluids specialists and/or controllers, at a rig site and/or operating remotely, in selecting the most suitable treatment to control or improve performance. A CI may be a tailored index that combines real-time fluid measurements and input from one or more sources (e.g., a controller, a drilling engineer, etc.). As an example, a CI can quantify performance of drilling fluid to determine when a treatment is required in an automated way.

Monitoring the state of drilling fluids tends to be a complex, time-consuming task prone to error. As an example, a framework can facilitate this task and quantify drilling fluid health. For example, such a framework can compute a condition index (CI) for each fluid property while drilling. Such CIs may be tunable by a fluid expert, for example, according to operational needs, where one or more CIs may be exploited to construct a global CI that encapsulates an overall fluid state. A framework may operate in a robust and customizable manner, making it amenable to seamless assimilation in a fluid advisor workflow.

As an example, one or more CIs can be used to assess the effects of a treatment on the entire fluid system along with individual properties. By linking a CI-based assessment to time series fluid treatment data, a framework may distinguish between the effect of a single treatment having a large effect and three treatments having smaller individual but larger overall effects (e.g., positive and/or negative). As an example, a framework can determine relative importance of each property to be incorporated into an assessment and directionality of each property. As an example, such an approach may be used to assess the relative quality of complex fluid and/or other systems, whether in the oil and gas industry and/or one or more other industries.

As an example, a framework can operate using one or more condition indexes. For example, consider a global condition index (CI) to assess fluid performance; a double-weighting element to reflect the relative importance of specific properties to the CI and their directionality; a holistic treatment assessment using one or more CIs and time series treatment data; and a self-learning process that can recommend treatments and predict likely effects.

As to a global condition index (GCI), it may be used to assess the global performance of drilling fluids. As an example, a controller and/or a fluids engineer may monitor evolution of rheology and chemical properties around a given target value or values. Due to the drilling process, properties of fluid tend to change and depart from one or more working target values. In various instances, each fluid property may have a maximum and/or a minimum, which may be above and below a respective target. Such extrema may be referred to as specification values and find use by a fluids engineer to adjust a drilling fluid formula.

A U.S. nonprovisional patent application having Ser. No. 18/295,359, filed 4 Apr. 2023, is incorporated by reference herein in its entirety. A U.S. provisional patent application having Ser. No. 63/541,473, filed 29 Sep. 2023, is incorporated by reference herein in its entirety.

As explained, a framework can provide for defining a number of fluid states to capture domain knowledge for one or more fluid automation paths. Such an approach can facilitate an understanding of what is happening to fluid when examining data channels. As an example, a method such as the method 700 of FIG. 7 may utilize fluid states where, for example, an operator can readily be informed of what is happening to fluid at a rig site where, for example, a controller and/or a human may tie states, trends, etc., to one or more actions, which may include one or more machine actions, human actions, human and machine actions, etc.

Figure 8:
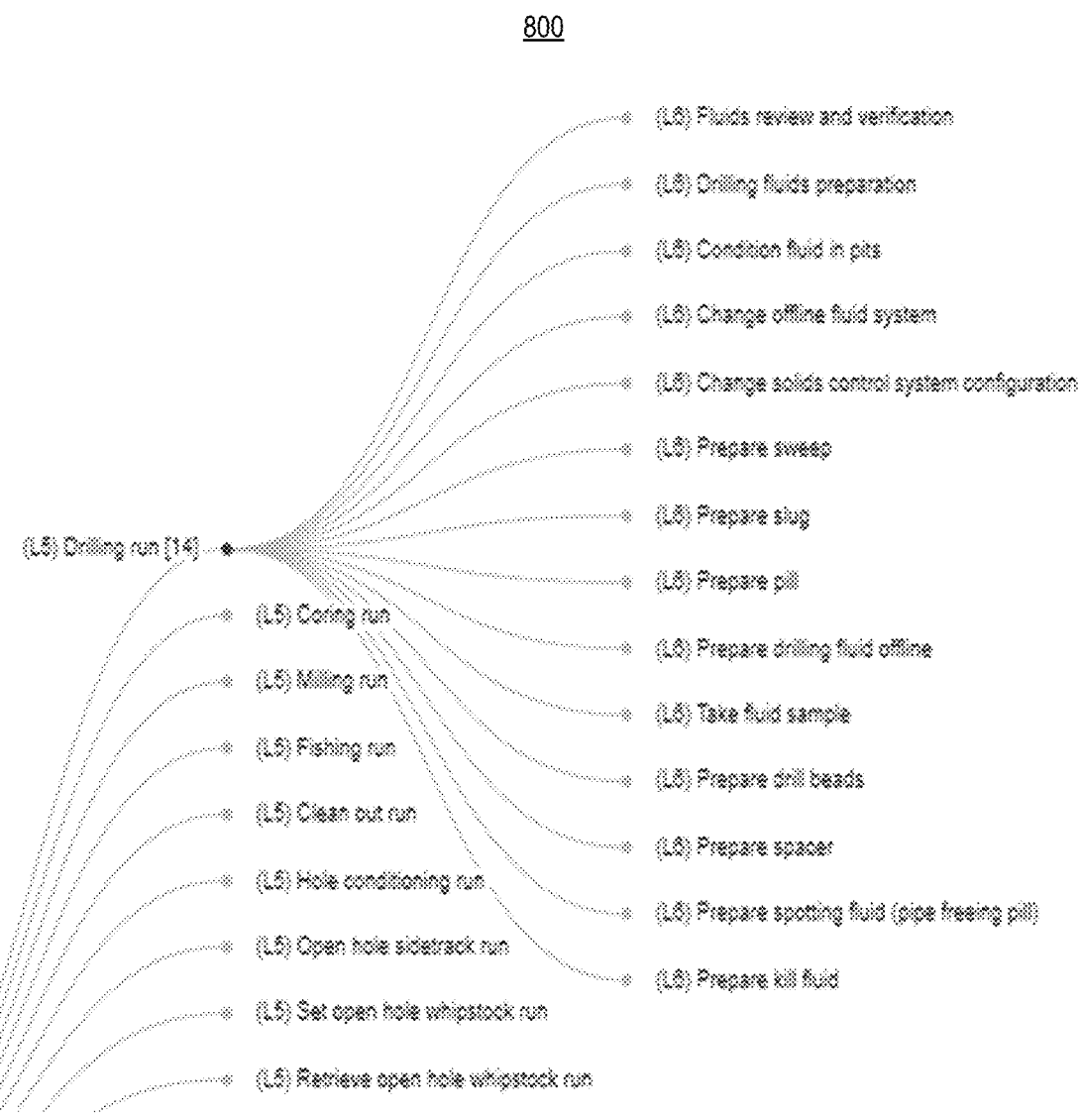
FIG. 8 shows an example of a graphical user interface.

FIG. 8 shows an example GUI 800 as to various fluid states associated with a particular drilling run. In such an approach, the GUI 800 may be hierarchical where the drilling run may be a rig state at a particular level and where fluid states are at a sub-level.

Figure 9:
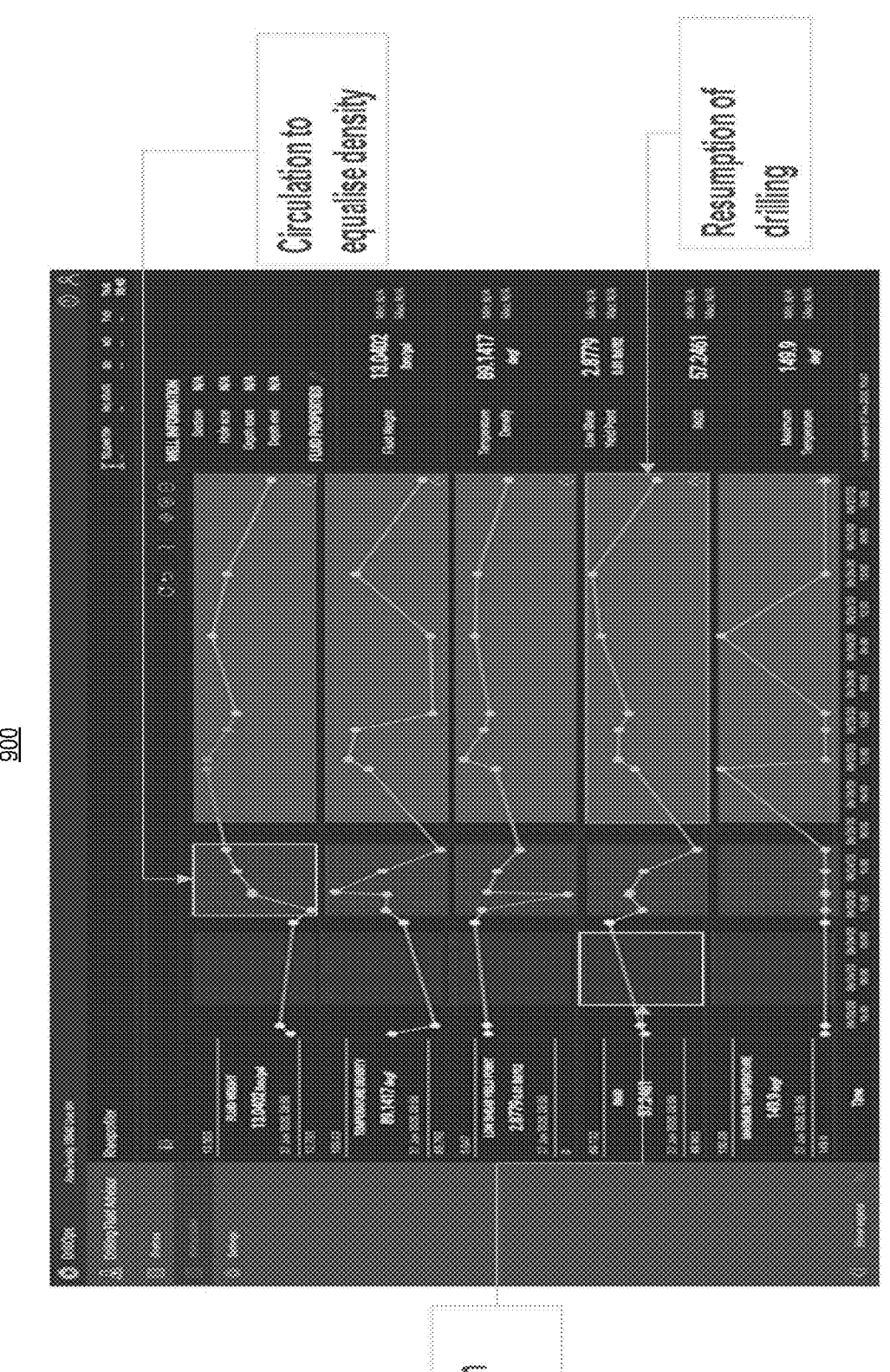
FIG. 9 shows an example of a graphical user interface.

FIG. 9 shows an example GUI 900 as to various fluid states that may be rendered with respect to time. As shown, a framework may utilize fluid states for detection of various fluid-related processes and/or conditions of fluid. As shown in the GUI 900, an initial addition of barite is detected where a framework may identify this addition as treating with a density sub-state as a fluid state. Further, as shown in the GUI 900, a period of circulation is identified as conditioning with a return to drilling once the density is even. As explained, use of fluid states can provide for assessment of real-time and/or historical data as to what is happening and/or what happened at a rig site. Such an approach may provide for enhanced generation of control actions, which may occur in an automated manner for implementation according to one or more levels of control (e.g., automated levels, semi-automated levels, etc.).

In the example GUI 900, various tracks may be rendered with respect to time that provide for indications as to various fluid characteristics. For example, consider one or more of a fluid weight track, a temperature density track, a low shear yield point track, an R600 track (e.g., or other rheometric data track), a maximum temperature track, etc.

As shown, one or more of the tracks in the GUI 900 can be utilized to determine what is occurring with respect to time. As indicated, the rheometric data track can be utilized to detect addition of a material such as barite, the fluid weight track can be utilized to detect denser fluid arrival back at surface in a manner that may be compared to a target fluid weight, and, as time moves forward with circulation, evolution of fluid characteristics may be detected (e.g., at first circulation, second circulation, etc.), which may be compared to one or more targets. In the GUI 900, one fluid state can be associated with addition of barite (see, e.g., rheometric track), another fluid state can be associated with circulation to equalize density (see, e.g., fluid weight track), and yet another fluid state can be associated with resumption of drilling, which may be evidenced by one or more tracks, which may exhibit one or more patterns with respect to time and/or relative characteristics at one or more points in time, which may be compared to one or more targets, expected values, etc.

As explained, the GUI 900 shows detection of barite, which is identified as a treating with a density altering additive state (e.g., a density sub-state), a period of circulation is identified as a conditioning state, and a return to drilling state is identified once density is substantially constant (e.g., even) with respect to some period of time (e.g., within one or more limits, ranges, etc.). In such an example, a framework may utilize one or more tracks of data for purposes of state detection. As shown in the example of FIG. 9, the GUI 900 provides multiple examples as to fluid state detection; noting that such types of data and/or other data may provide for detection and/or prediction of one or more other states (see, e.g., the example states of the table 500 of FIG. 5).

As explained, data may be annotated and/or reduced to a state representation data structure. As explained, fluid states may be combined with one or more other types of states such as, for example, rig states (e.g., drilling states that involve rig operations). As an example, a planner may be a framework that can generate a digital plan for performing field operations, which may be consumable by one or more controllers. In such an example, the planner may generate a digital plan using states where, for example, control during plan implementation may provide for state monitoring where, for example, if a planned state is not reached (e.g., within a period of time), the planner may be triggered for purposes of re-planning (e.g., plan adjustment). As explained, control of a fluid system in the field may be accomplished in a state-based manner that utilizes one or more types of data (e.g., data channels) that may be acquired in real-time or near real-time in the field.

As an example, a state-based approach to one or more of fluid system monitoring, control, assessment, etc., may facilitate one or more types of machine learning for generating one or more trained machine learning models. For example, consider a machine learning model that can be trained on the basis of fluid states, which may, for example, provide for input of one or more types of data and detection and/or prediction of one or more fluid states. As an example, a machine learning model may be trained using a combination of state types such as, for example, rig states and fluid states. As an example, a planner may utilize multiple types of states such as, for example, rig states and fluid states.

As mentioned, one or more types of data may be utilized for purposes of fluid state detection, monitoring, control, assessment, etc. As to rheometric data, as an example, rheometers used in drilling fluid measurements may provide for measurement of shear stress at one or more shear rates. For example, with a concentric cylinder rheometer, an outer cylinder may be rotated at a particular speed (e.g., 300 rpm, 600 rpm, etc.) and the shear stress measured (e.g., lb/100 ft$^2$). As an example, plastic viscosity (PV) of a drilling fluid may be computed by subtracting a 300-rpm shear stress (R300) value from a 600-rpm shear stress (R600) value. As an example, a yield point (YP) of drilling fluid (YP) may be computed by subtracting a PV value from a R300 value. In such an example, multiplying rpm by 1.7 can change units to reciprocal seconds and, for example, multiplying the shear rate in lb/100 ft$^2$ by 5.11 can change the units to dynes/cm$^2$.

As an example, data may provide for characterizing transport capabilities of drilling fluid. For example, transport of drilled solids may demand increasing the low-shear rate viscosity of a drilling fluid be sufficient to prevent solids from tumbling in an annulus of a borehole; noting that API RP13D guidelines may be available for instances for drilling fluid at angles less than an angle of repose of drilled solids in a borehole (e.g., consider approximately 35 degrees to approximately 40 degrees). As an example, an empirical carrying capacity index (CCI) may be computed, which may be utilized for one or more types of drilling fluid (e.g., water-based or non-aqueous drilling fluid (NADF)). As to a CCI, consider multiplying mud weight by annular velocity and a parameter of effective viscosity (e.g., K-viscosity) and then dividing by another parameter where the parameter of effective viscosity may be based on shear rate and shear stress and a factor that is unity for Newtonian fluid and less than unity for various types of non-Newtonian fluids.

While some examples of data are mentioned (see, e.g., the GUI 900, the table 600, etc.), one or more other types of data may be utilized in a fluid state-based approach. As to fluid states, these may be defined in association with one or more types of data, data trends, data interdependencies, etc. As explained, a machine learning approach may be implemented for fluid states, which may be utilized as inputs and/or as outputs. As an example, a chain of machine learning models may be utilized, for example, consider a first model that can output a fluid state or states and a second model that can receive a fluid state or states as input to generation output, which may pertain to control, prediction, assessment (e.g., effectiveness of a treatment, etc.), etc.

Figure 10:
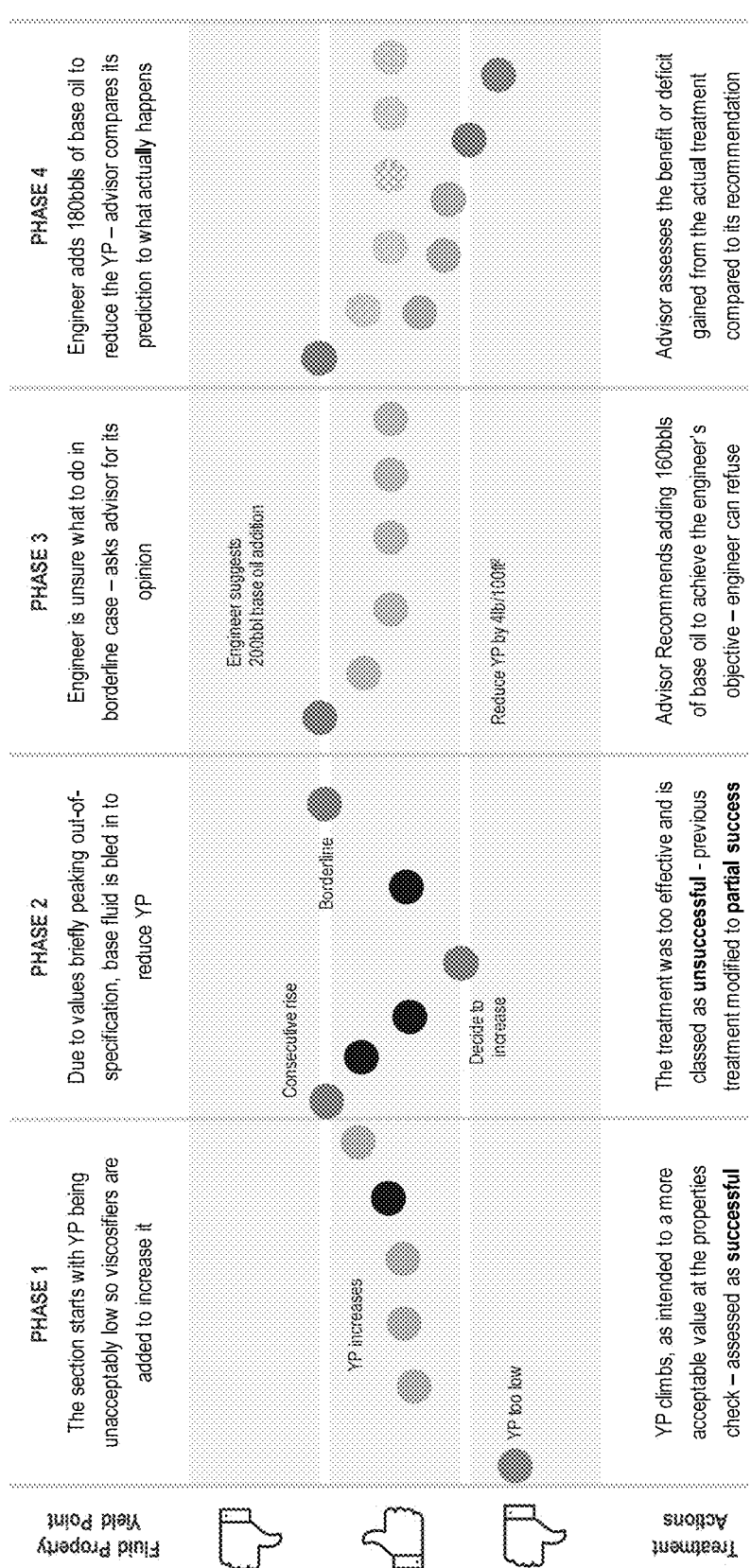
FIG. 10 shows an example of a graphical user interface.

FIG. 10 shows an example of a GUI 1000 that may be rendered to a display during field operations, for example, to assess real-time operations and/or to assess historical operations. In the example of FIG. 10, the GUI may utilize fluid states to generate one or more visualizations, which can include labels, coding, etc., to indicate what is occurring and/or what has occurred at a rig site. In the example GUI 1000, indications may be generated as to success and/or failures of one or more actions. For example, a treatment may be deemed successful, partially successful or unsuccessful, where, for example, such characterizations may be utilized for training and/or re-training one or more framework components, which may be for state detection, recommendation generation, control action formulation, etc. As an example, fluid states may be utilized in generation of phases such that a series of phases can be utilized to describe what has happened and/or what is happening.

Figure 11:
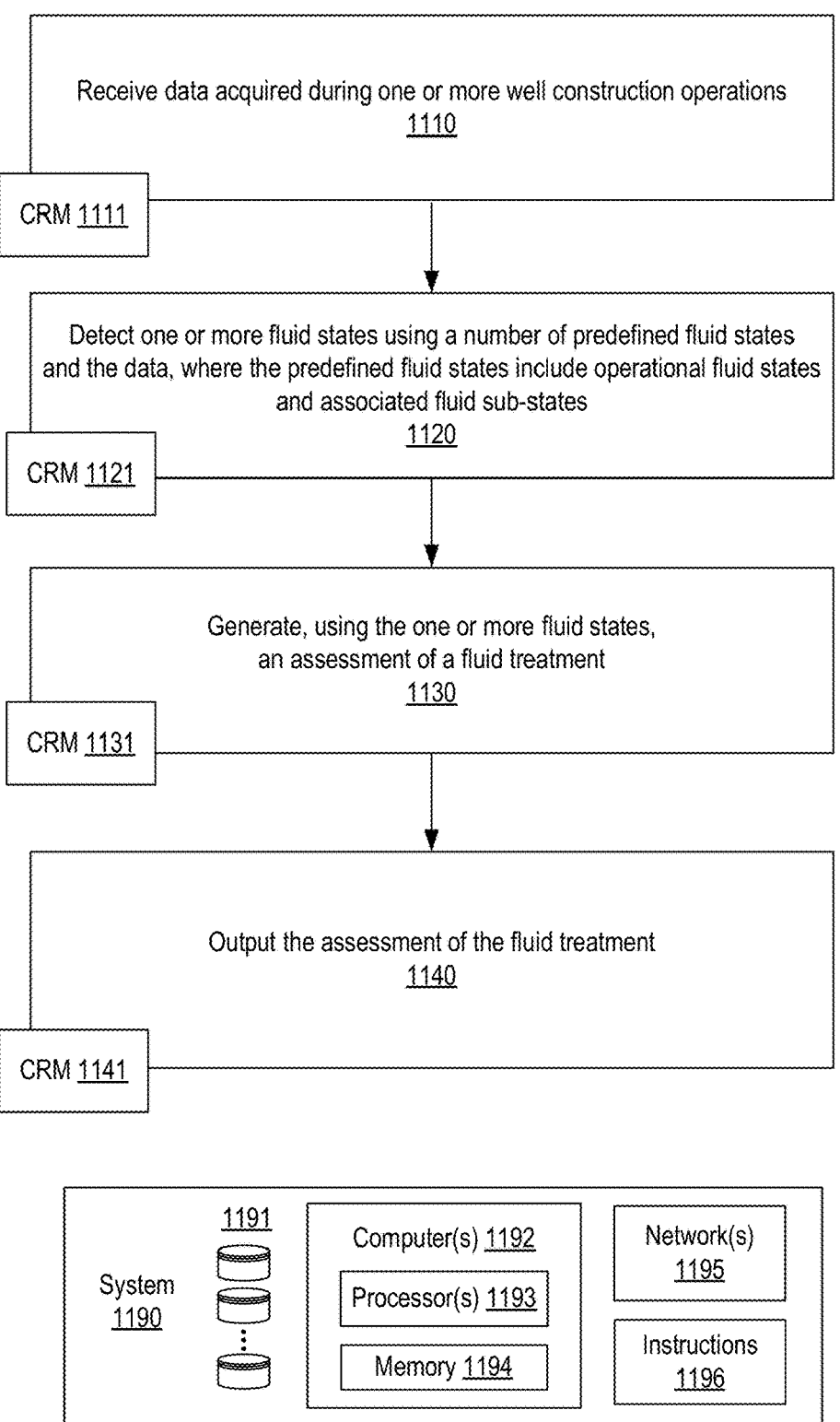
FIG. 11 shows an example of a method and an example of a system.

FIG. 11 shows an example of a method 1100 and an example of a system 1190. As shown, the method 1100 may include a reception block 1110 for receiving data acquired during one or more well construction operations; a detection block 1120 for detecting one or more fluid states using a number of predefined fluid states and the data, where the predefined fluid states include operational fluid states and associated fluid sub-states; a generation block 1130 for generating, using the one or more fluid states, an assessment of a fluid treatment; and an output block 1140 for outputting the assessment of the fluid treatment.

FIG. 11 also shows various computer-readable media (CRM) blocks 1111, 1121, 1131, and 1141. Such blocks may include instructions that are executable by one or more processors, which may be one or more processors of a computational framework, a system, a computer, etc. A computer-readable medium may be a computer-readable storage medium that is not a signal, not a carrier wave and that is non-transitory. For example, a computer-readable medium may be a physical memory component that may store information in a digital format.

In the example of FIG. 11, a system 1190 includes one or more information storage devices 1191, one or more computers 1192, one or more networks 1195 and instructions 1196. As to the one or more computers 1192, each computer may include one or more processors (e.g., or processing cores) 1193 and memory 1194 for storing the instructions 1196, for example, executable by at least one of the one or more processors. As an example, a computer may include one or more network interfaces (e.g., wired or wireless), one or more graphics cards, a display interface (e.g., wired or wireless), etc. The system 1190 may be specially configured to perform one or more portions of the method 1100 of FIG. 11.

As an example, a computational framework may include a solver, which may be implemented via executable instructions. For example, consider a computational framework that includes a processor and memory accessible to the processor where executable instructions may be stored in the memory and accessed for execution by the processor to cause the computational framework to perform one or more actions. Such a computational framework may include one or more interfaces for receipt of information and/or for output of information, which may include values of parameters, an instruction, etc. As an example, a computational framework may be part of a controller. As an example, a computational framework may be part of a system.

As an example, various systems, methods, etc., may implement one or more ML models. As to types of ML models, consider one or more of a support vector machine (SVM) model, a k-nearest neighbors (KNN) model, an ensemble classifier model, a neural network (NN) model, etc. As an example, a machine learning model may be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a system may utilize one or more recurrent neural networks (RNNs). One type of RNN is referred to as long short-term memory (LSTM), which may be a unit or component (e.g., of one or more units) that may be in a layer or layers. A LSTM component may be a type of artificial neural network (ANN) designed to recognize patterns in sequences of data, such as time series data. When provided with time series data, LSTMs take time and sequence into account such that an LSTM may include a temporal dimension. For example, consider utilization of one or more RNNs for processing temporal data from one or more sources, optionally in combination with spatial data. Such an approach may recognize temporal patterns, which may be utilized for making predictions (e.g., as to a pattern or patterns for future times, etc.).

As an example, the TENSORFLOW framework (Google LLC, Mountain View, California) may be implemented, which is an open-source software library for dataflow programming that includes a symbolic math library, which may be implemented for machine learning applications that may include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As mentioned, a framework such as the PYTORCH framework may be utilized.

As an example, a training method may include various actions that may operate on a dataset to train a ML model. As an example, a dataset may be split into training data and test data where test data may provide for evaluation. A method may include cross-validation of parameters and best parameters, which may be provided for model training.

The TENSORFLOW framework may run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations may be expressed as stateful dataflow graphs; noting that the name TENSORFLOW derives from the operations that such neural networks perform on multidimensional data arrays. Such arrays may be referred to as "tensors".

As an example, a method can include receiving data acquired during one or more well construction operations; detecting one or more fluid states using a number of predefined fluid states and the data, where the predefined fluid states include operational fluid states and associated fluid sub-states; generating, using the one or more fluid states, an assessment of a fluid treatment; and outputting the assessment of the fluid treatment. In such an example, data can include real-time data and/or historical data.

As an example, an assessment of a fluid treatment may be or include a recommendation for implementation of the fluid treatment.

As an example, a method can include outputting that outputs an assessment of a fluid treatment for implementation of the fluid treatment. In such an example, the method can include implementing the fluid treatment. As an example, a method may include responsive to implementation of a fluid treatment, receiving additional data and detecting one or more fluid states using a number of pre-defined fluid states and at least a portion of additional data. In such an example, a method may include, based at least in part on the detecting using the at least a portion of the additional data, determining a level of success of the fluid treatment.

As an example, an assessment of a fluid treatment can include an assessment of an implemented fluid treatment.

As an example, a method can include training a machine learning model based at least in part on an assessment of a fluid treatment. In such an example, the machine learning model may be or include a fluid state detection model and/or a fluid treatment assessment model. As an example, a fluid treatment assessment model may generate one or more fluid treatments responsive to one or more detected fluid states.

As an example, operational fluid states may include one or more of a drilling state, a circulating state, a treating state, a transferring state, a cementing state, a displacing state, a dilution state, a discharging state, a conditioning state, and a filtering state.

As an example, fluid sub-states may include one or more of a volume related state, a density related state, a plug related state, a tank related state, a cement related state, a brine related state, and a test related state.

As an example, a method can include generating that generates assessments for different fluid treatments and include, based at least in part on the assessments, recommending at least one of different fluid treatments.

As an example, a method can include outputting that includes storing an assessment of a fluid treatment to a database in association with one or more detected fluid states. In such an example, a method may include planning one or more of one or more well construction operations using the database.

As an example, a system can include one or more processors; memory accessible to at least one of the one or more processors; processor-executable instructions stored in the memory and executable to instruct the system to: receive data acquired during one or more well construction operations; detect one or more fluid states using a number of predefined fluid states and the data, where the predefined fluid states include operational fluid states and associated fluid sub-states; generate, using the one or more fluid states, an assessment of a fluid treatment; and output the assessment of the fluid treatment.

As an example, one or more computer-readable storage media can include processor-executable instructions to instruct a computing system to: receive data acquired during one or more well construction operations; detect one or more fluid states using a number of predefined fluid states and the data, where the predefined fluid states include operational fluid states and associated fluid sub-states; generate, using the one or more fluid states, an assessment of a fluid treatment; and output the assessment of the fluid treatment.

As an example, a computer program product that may include computer-executable instructions to instruct a computing system to perform one or more methods such as one or more of the methods described herein (e.g., in part, in whole and/or in various combinations).

Figure 12:
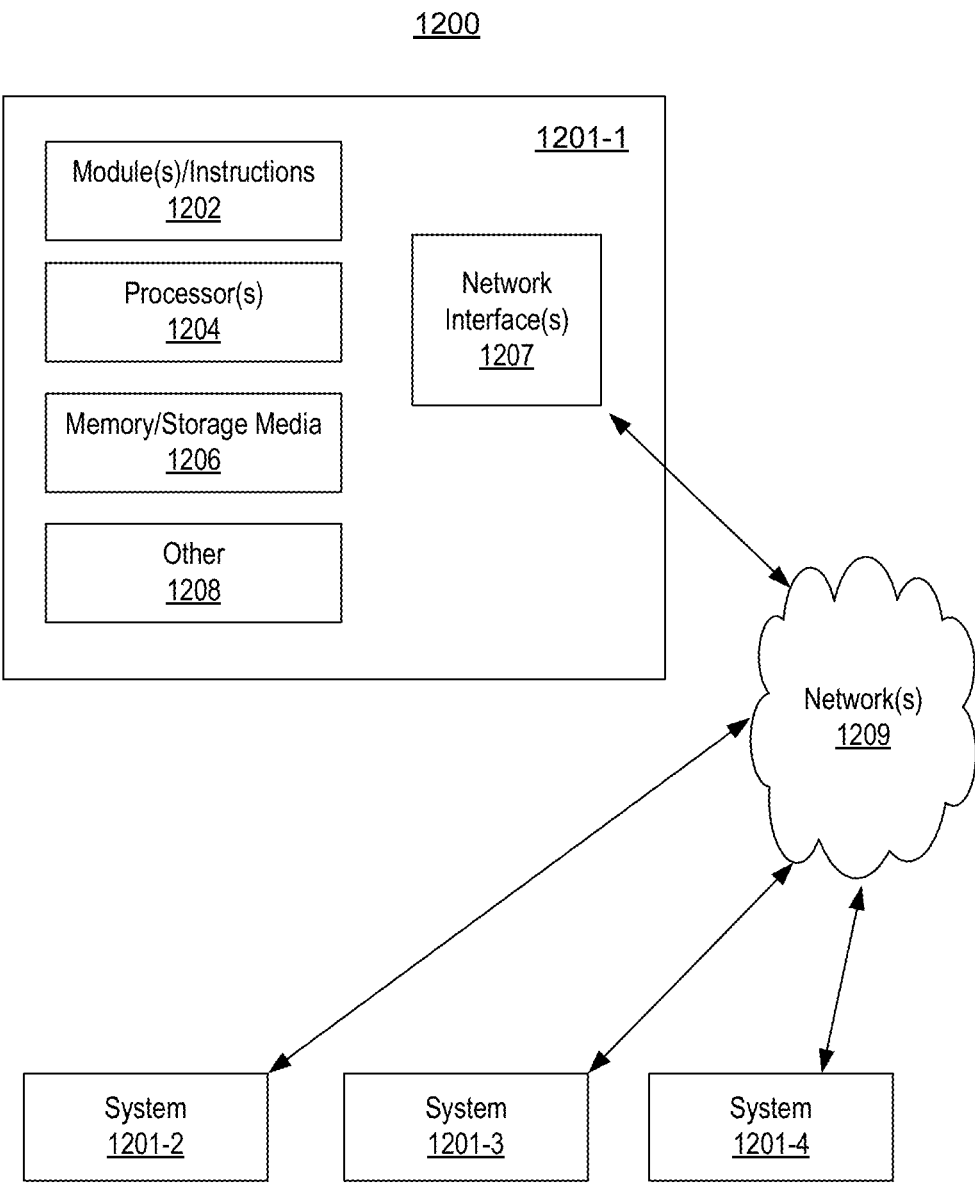
FIG. 12 shows an example of a system.

In some embodiments, a method or methods may be executed by a computing system. FIG. 12 shows an example of a system 1200 that may include one or more computing systems 1201-1, 1201-2, 1201-3 and 1201-4, which may be operatively coupled via one or more networks 1209, which may include wired and/or wireless networks. As shown, the system 1200 may include one or more other components 1208.

As an example, a system may include an individual computer system or an arrangement of distributed computer systems. In the example of FIG. 12, the computer system 1201-1 may include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more storage media 1206 (e.g., via wire, wirelessly, etc.). As an example, one or more of the one or more processors 1204 may be operatively coupled to at least one of one or more network interface 1207. In such an example, the computer system 1201-1 may transmit and/or receive information, for example, via the one or more networks 1209 (e.g., consider one or more of the Internet, a private network, a cellular network, a satellite network, etc.). As shown, one or more other components 1208 may be included in the computer system 1201-1.

As an example, the computer system 1201-1 may receive from and/or transmit information to one or more other devices, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include general-purpose processors or application specific chips (e.g., or chipsets), such as ASICS, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that may be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

circulating drilling fluid while drilling a well;

at a computational framework including at least one processor and display device, receiving data acquired during the drilling, wherein the data includes rheometric data and fluid weight data both related to the drilling fluid circulated during the drilling;

at the computational framework, displaying a graphical user interface that includes the rheometric data over time and the fluid weight data over time;

adding material to the drilling fluid circulated in the well during a period of circulation to change density of the drilling fluid circulated in the well;

at the computational framework, detecting a first fluid state related to the addition of the material to the drilling fluid based on the rheometric data, and displaying a visual indication of the first fluid state on the graphical user interface;

at the computational framework, detecting a second fluid state related to circulation of the drilling fluid to equalize density of the drilling fluid based on the fluid weight data, and displaying a visual indication of the second fluid state on the graphical user interface; and returning to drilling the well in response to detection of the second fluid state.

2. The method of claim 1, wherein the data comprise real-time data.

3. The method of claim 1, further comprising:

at the computational framework, detecting at least one operational state related to circulation of the drilling fluid or drilling operations, and displaying a visual indication of the at least one operational state on the graphical user interface.

4. The method of claim 1, wherein the material added to the drilling fluid comprises barite.

* * * * *